United States Patent [19]
Meyer et al.

[11] Patent Number: 5,704,435
[45] Date of Patent: Jan. 6, 1998

[54] HAND HELD POWER TOOL INCLUDING INERTIA SWITCH

[75] Inventors: Gary D. Meyer, Waukesha; Richard H. Jungmann, Richfield, both of Wis.

[73] Assignee: Milwaukee Electric Tool Corporation, Brookfield, Wis.

[21] Appl. No.: 516,092

[22] Filed: Aug. 17, 1995

[51] Int. Cl.⁶ .............................. H02P 7/00; B27B 17/02
[52] U.S. Cl. ........................ 173/176; 173/2; 30/381
[58] Field of Search .................. 30/381, 382; 173/2, 173/176

[56] References Cited

U.S. PATENT DOCUMENTS

| | | | |
|---|---|---|---|
| 3,974,566 | 8/1976 | Pilatowicz | 30/382 |
| 4,402,138 | 9/1983 | Glöckle et al. | 30/382 |
| 4,560,040 | 12/1985 | Mörner et al. | 30/381 |
| 5,125,160 | 6/1992 | Gassen | 30/382 |
| 5,126,643 | 6/1992 | French | 318/434 |
| 5,155,421 | 10/1992 | Hansson | 318/434 |
| 5,201,373 | 4/1993 | Bioechle | 173/109 |
| 5,294,874 | 3/1994 | Hessenberger et al. | 318/759 |

FOREIGN PATENT DOCUMENTS

| | | | |
|---|---|---|---|
| 0 150 669 A2 | 12/1984 | European Pat. Off. | B23B 45/04 |
| 0 345 655 A2 | 6/1989 | European Pat. Off. | B25F 5/00 |
| 1 055 086 | 4/1959 | Germany . | |
| 37 07 052 A1 | 9/1988 | Germany | B25F 5/00 |
| 43 34 933 A1 | 4/1995 | Germany | H02H 7/00 |
| 43 44 817 A1 | 6/1995 | Germany | F16P 3/00 |
| WO95/32514 | 11/1995 | WIPO | H01H 35/02 |

*Primary Examiner*—Joseph J. Hail, III
*Assistant Examiner*—Jay A. Stelacone
*Attorney, Agent, or Firm*—Michael, Best & Friedrich

[57] ABSTRACT

A hand held power tool includes a motor coupled to an output element and an inertia switch operative to disable the output element upon movement of the tool at a rate greater than a determined rate. The inertia switch disables the output element by open circuiting the motor or uncoupling the output element from the motor.

22 Claims, 2 Drawing Sheets

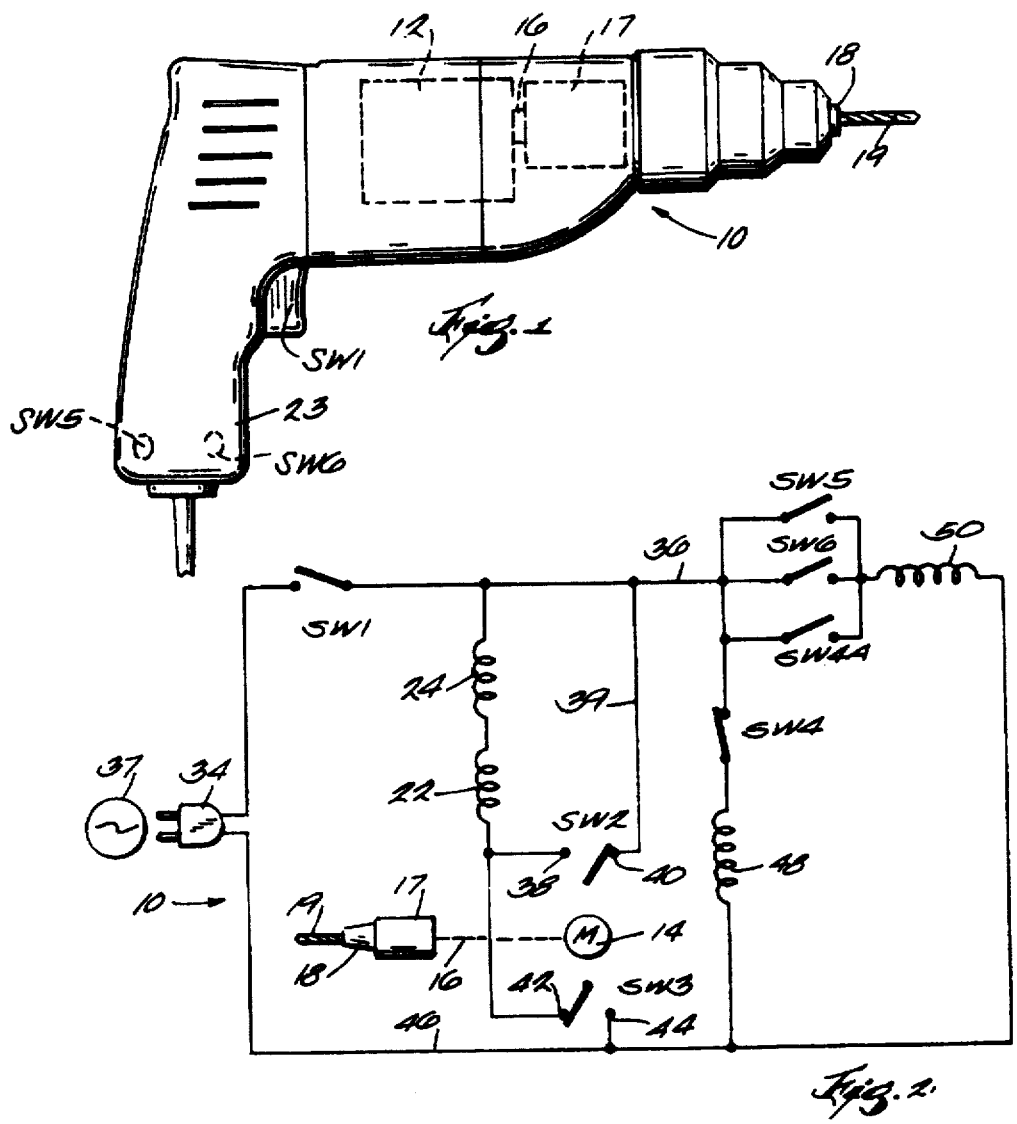
Fig. 1
Fig. 2
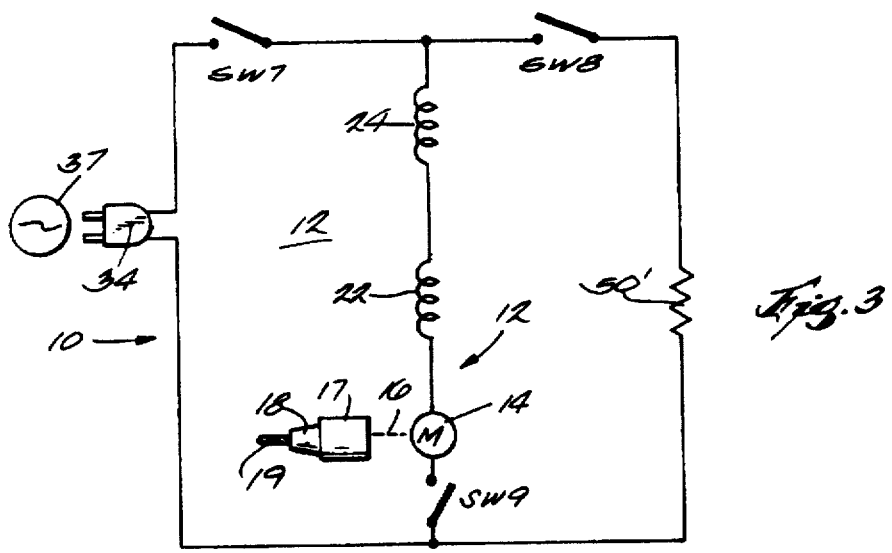
Fig. 3

HAND HELD POWER TOOL INCLUDING INERTIA SWITCH

BACKGROUND OF THE INVENTION

This invention relates to power tools and more particularly to a power interrupt system for hand held power tools.

Hand held power tools include a motor coupled by drive gears to an output element, such as a saw blade, a drill bit, disc or belt sander or the like. Should the blade of a saw bind in the work piece, the tool tends to jerk or kick back toward the operator. Similarly, should a drill bit bind, the drill tends to twist about the axis of the bit. In either case, if the drive motor continues to operate or remains coupled to the output element, the operator could have difficulty controlling the power tool.

Prior art tools addressed this problem by employing torque limiting devices, such as clutches, which disconnected the drive motor from the output element when the torque exceeded some preset value. While this served to reduce the occurrences of tool kick-back or axial twisting, it limited the use of the tool in high torque applications in which the operator has sufficient control to prevent sudden movement of the tool.

SUMMARY OF THE INVENTION

It is a primary object of the invention to provide a new and improved hand held power tool.

A further object of the invention is to provide a hand held power tool which permits more operational flexibility.

Another object of the invention is to provide a hand held power tool in which kickback or rapid rotation of the tool resulting from a binding output element is minimized.

In general terms the invention comprises a hand held power tool having an output element and a motor coupled to the output element for imparting motion thereto relative to a work piece. The tool includes an inertia responsive means operative upon sudden acceleration of the tool or other movement of the tool at a rate greater than that intended by the operator to disable the output element. According to one embodiment of the invention, the inertia responsive means includes inertia responsive switch means operative upon sudden acceleration of the handle or housing of the tool to disconnect the motor from its power source. According to another embodiment of the invention, the inertia responsive means is operative to uncouple the output element from the motor and its stored energy upon rapid acceleration of the tool. In accordance with a further embodiment, the inertia responsive means is operative upon sudden acceleration to disconnect the drive motor from the energy source and to effect the absorption of the motor's rotational energy.

In a specific embodiment of the invention, the hand held power tool is a power drill, wherein the inertia switch may be housed in the handle of the drill at a position spaced from the axis of rotation of the drill spindle. In the event the drill bit binds in a work piece, the handle tends to move through an arc about the axis of rotation of the drill bit. Such movement of the drill handle will actuate the inertia switch. By positioning the inertia switch in the drill handle and in spaced relation from the axis of the spindle, the inertia switch can immediately sense any movement of the drill caused by binding of the drill bit in the work piece. The invention also contemplates the use of a rotation responsive inertia switch which would then be located on the rotational axis or in spaced relation from the rotational axis.

In another embodiment of the invention, the power tool comprises a circular saw wherein the inertia switch may be housed in the handle or body of the saw. The inertia switch is positioned such that in the event the saw blade binds in a work piece and kicks back toward the operator, the inertia switch immediately senses such movement of the saw and terminates operation.

BRIEF DESCRIPTION OF THE DRAWINGS

FIG. 1 shows a first embodiment of the invention comprising an electric hand drill having an inertia switch;

FIG. 2 schematically illustrates the hand held tool illustrated in FIG. 1;

FIG. 3 schematically illustrates an alternative embodiment of the invention;

DETAILED DESCRIPTION OF THE INVENTION

Figure 4:
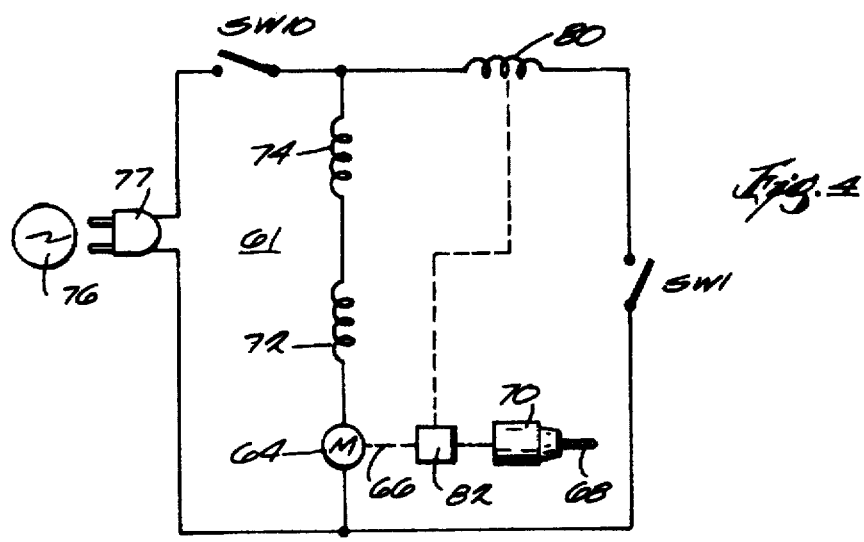
FIG. 4 schematically illustrates a further embodiment of the invention.

FIG. 1 illustrates a hand held power tool 10 embodying the invention and which in the illustrated example is a drill. However, it will be appreciated by those skilled in the art that the invention has application to other power tools, such as saws, belt sanders, disc sanders and the like.

The power tool 10 is shown in FIG. 2 to include a conventional electric motor 12 which will not be described in detail for the sake of brevity. It will be sufficient for purposes of understanding the invention to state that the motor 12 includes a rotatably mounted armature 14 having an output shaft 16 coupled in a conventional manner such as through a gear train 17 to an output element, such as drill spindle 18 supporting a drill bit 19. Those skilled in the art will appreciate that the armature 14 includes windings (not shown) for generating an armature field. Electrical energy is transferred to the rotating armature through commuter brushes (not shown). The motor 12 may also include a pair of run windings 22 and 24 for generating a magnetic field for rotating the armature 14. In the illustrated embodiment, the run windings 22 and 24 are connected in series and are preferably electrically identical and oriented on the opposite sides of the armature 14 to provide a magnetic field which is evenly distributed. The tool also includes a handle 23 and an on/off switch SW1. The run windings 22 and 24 are coupled to one side of a plug 34 through an on/off switch SW1 and a conductor 36. The plug 34 is adapted to be connected to a power source 37. The other side of the run windings 22 and 24 are connected to switches SW2 and SW3. Switch SW2 includes a first contact 38 connected to the run windings 22 and 24 and a second contact 40 by conductor 39 connected to conductor 36. Switch SW3 also has a first contact 42 connected to windings 22, 24 and a second contact 44 connected to a return conductor 46. The armature 14 is connected between switches SW2 and SW3.

A relay is mechanically connected to switches SW2 and SW3 and includes a coil 48 connected in series with a normally closed switch SW4 between conductors 36 and 46. A second relay coil 50 is mechanically coupled to switch SW4 and is connected between conductors 36 and 46 through the parallel combination of oppositely oriented uni-directional inertia switches SW5 and SW6 which are normally open. Switch SW4A is a latching contact for second relay coil 50 as long as switch SW1 is closed.

When relay coil 48 is de-energized, switch SW2 is on contact 40 and switch SW3 is on contact 42 as shown in FIG. 3. In addition, switch SW4 is normally closed and switches SW5 and SW6 and SW4A are normally open. When manual switch SW1 is closed, relay coil 48 is energized to move switch SW2 to contact 38 and switch SW3 to contact 44. This energizes the run windings 22 and 24 and the rotor 14. The tool 10 then operates in the normal manner.

Should the drill bit 19 bind causing rapid rotational movement of the tool 10, one of the inertia switches SW5 or SW6 will operate, depending upon the direction of rotation. In either event, this energizes relay coil 50 which opens switch SW4 thereby de-energizing the relay coil 48 and closes latching switch SW4A which keeps relay coil 50 energized even after SW5 or SW6 open. This moves switch SW2 to contact 40 and switch SW3 to contact 42 thereby disconnecting the run windings 22, 24, and the rotor 14 from the power source 37. In addition, the run windings 22 and 24 are connected in a closed loop with the rotor 14 so that the rotational energy of the rotor 14 generates a counter EMF across the windings 22 and 24 thereby producing a dynamic breaking effect. In this manner, the rotational energy is quickly dissipated as heat. Relay coil 50 will remain in its latched state until on/off SW1 is opened disconnecting relay coil 50 from the power source 37. Relay coil 50 becomes de-energized which opens SW4A thereby relay coil 50 returns to an unlatched state.

FIG. 2 shows a pair of uni-directional inertia switches SW5 and SW6. While any suitable switches may be employed, in the preferred embodiment, Aerodyne Model No. 7832-1-000 switches are employed. These switches momentarily make contact and then reopen when acceleration ceases. Alternately, a single bi-directional or rotational inertia switch may be substituted for the uni-directional switches SW5 and SW6.

The uni-directional inertia switches SW2 and SW3 are positioned in the handle 23 so that they are spaced from the rotational axis of the drill bit 19 as shown in FIG. 1 to insure sufficient linear acceleration to effect operation. A bi-directional inertia switch would be similarly positioned in the handle 23 while a rotational inertia switch could be positioned at the rotational axis of drill bit 19 or in the handle 25.

While electromagnetic relays 48 and 50 are shown for operating switches SW2, SW3, SW4 and SW4A, it will be appreciated that this function can also be performed by electronic switches as well. Thus, the term switching means as used in the appended claims is intended to mean any well known type of switching device or element.

FIG. 3 shows an alternate embodiment of the invention to include switches SW7 and SW9 connected in series between a power source 37 and the run windings 22 and 24 and the armature 14. Switch SW7 is an on/off switch for manually connecting the motor 12 to the power source 37. A normally open inertia response switch SW8 is connected in series with relay coil 50 in parallel with the motor 12. Switch SW8 is operable to close upon rapid acceleration to energize coil 50 which opens normally closed contacts SW9 in series with motor 12.

Operation of the tool 10 is initiated by closing the on/off switch SW7. This energizes the run windings 22 and 24 and the armature windings (not shown) causing the armature to rotate thereby driving the drill bit 19 in a conventional manner. Should the drill bit 19 bind, the handle 23 of tool 10 may be caused to jerk or rotate about the axis of the drill bit. This rapid acceleration of the handle 23 closes switch SW8 to energize coil 50 which opens switch SW9, thereby disconnecting the motor 12 from the power source 37 and disabling the tool 10 until the switch SW9 is reset.

FIG. 4 shows schematically another alternative embodiment of the invention and including a hand held power tool which includes a motor 61 having a rotor 64 connected by an output shaft 66 to an output element, such as a drill bit 68, through a gear train 70. The motor 61 also includes run windings 72 and 74 connected in series with each other and with rotor 64 and the series combination connected to a power source 76 through an on/off switch SW10 and a plug 77. The coil of relay 80 is connected in series with a normally open inertia switch SW11 and the series combination is connected across the motor 61. The relay 80 is mechanically connected to a clutch 82 disposed between the motor shaft 66 and the gear train 70.

Operation of the motor 61 is initiated by closing on/off switch SW10 which energizes the rotor 64 and the run windings 72 and 74. Should the drill bit 68 bind in the work piece, whereby the tool is rapidly accelerated about the axis of tool bit 68, the inertia switch SW11 is caused to close. This energizes relay 80 which actuates clutch 82 to disconnect the drill bit 68 from the shaft 66. After the drill bit 68 has been released, switch SW11 can be reset to its open position thereby de-energizing the coil of relay 80 so that clutch 82 recouples gear train 70 to shaft 66. While in the embodiment of FIG. 4, the switch SW11 is indicated as being a latching type which must be reset, it is also contemplated that this switch may be the type which closes momentarily. In the latter event, the clutch 82 will be of the latching type which can be reset manually or electrically.

While in each of the embodiments referred to above a drill is shown as an example, it will be appreciated by those skilled in the art that each of the embodiments shown schematically in FIG. 2–4 can be employed with any type of tool which is likely to jerk, kick back, or spin should they bind in the work piece.

Figure 5:
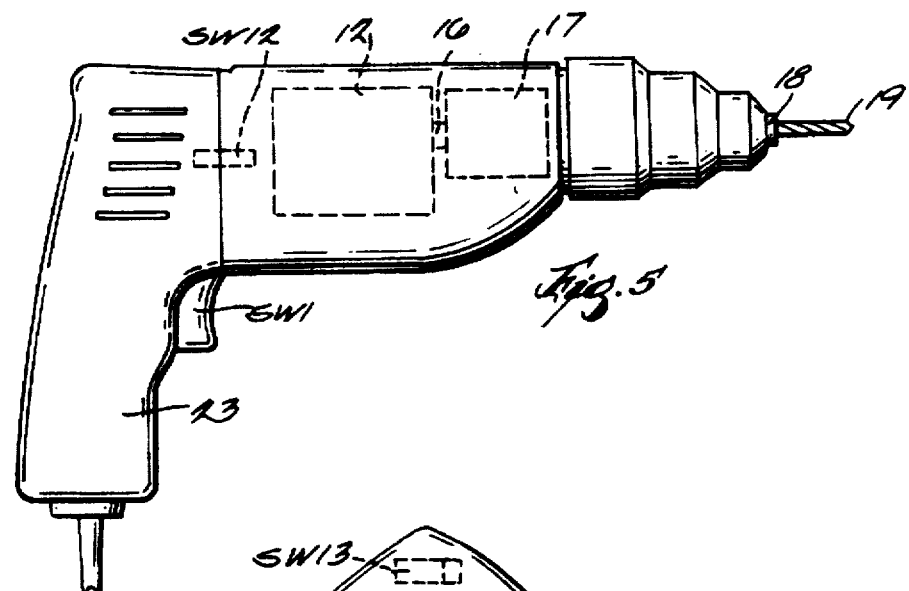
FIG. 5 shows another alternative embodiment of the invention.

FIG. 5 shows a drill similar to that of FIG. 1 except that the inertia responsive means is a rotationally responsive inertia switch SW12 located on the rotational axis of bit 19. Switch SW12 would replace the switches SW5 and SW6 of FIG. 2, the switch SW8 of FIG. 3 or SW11 of FIG. 4.

Figure 6:
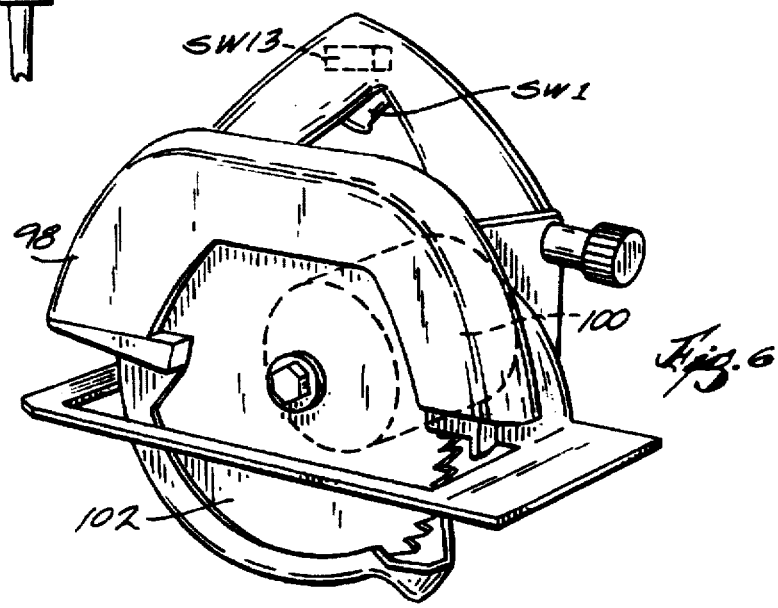
FIG. 6 shows another alternative embodiment of the invention including an electric circular saw having an inertia switch.

FIG. 6 illustrates another embodiment of the invention and wherein a circular saw 98 includes an inertia switch SW13. The circular saw includes a motor 100 drivingly connected to circular saw blade 102. During operation of the circular saw 98, if the blade encounters an obstruction or binds, the saw 98 will tend to jerk rearwardly with respect to the direction of cutting. The inertia switch SW13 is positioned such that if the saw jerks rearwardly, the inertia switch SW13 is caused to close. Switch SW13 would replace the switches SW5 and SW6 of FIG. 2, the switch SW8 of FIG. 3 or SW11 of FIG. 4.

While in the illustrated arrangement the inertia responsive means includes an inertia switch which is responsive to acceleration of the tool, other arrangements could be employed with electronics responsive to data indicating excessive velocity of the tool or position changes of the tool.

One of the primary advantages of the invention is that the inertia switch interrupts operation of the electric hand tool only if the operator loses control. The ability to control a hand tool depends on the skill and strength of the operator. A hand tool embodying the invention can accommodate any operator because operation of the tool is interrupted only if the tool jerks or spins sufficiently that the operator loses control.

Another advantage of the invention is that the effectiveness of the mechanism for interrupting operation of the hand tool can be easily tested by the operator. With the handle tool running, the operator can quickly move or jerk the handle of the tool to ensure interruption of operation of the tool.

We claim:

1. A hand-held tool comprising: a hand engaging portion, an output element, a motor adapted to be coupled to a power source and selectively coupled to said output element for imparting motion thereto relative to a work piece, and inertia responsive means for disconnecting said output element from the power source should said hand engaging portion move at a rate greater than a predetermined rate.

2. The hand-held tool set forth in claim 1 wherein said inertia responsive means disconnects said motor from the power source upon rapid acceleration of said hand engaging portion.

3. The hand-held tool set forth in claim 2 wherein said inertia responsive means is a switch, and wherein said switch electrically disconnects said motor from the power source upon rapid acceleration of said hand engaging portion.

4. The hand-held tool set forth in claim 1 wherein said motor includes a rotor coupled to said output element and clutch means for disconnecting said output element from said rotor, and wherein said inertia responsive means is coupled to said clutch means and actuates said clutch means to disconnect said output element from said rotor upon rapid acceleration of said hand engaging portion.

5. The hand-held tool set forth in claim 1 wherein said motor includes a rotor, drive means for coupling and coupling means for connecting and disconnecting said output element from said rotor, and wherein said inertia responsive means is coupled to said coupling means and actuates said coupling means to uncouple said rotor from said output element upon rapid acceleration of said tool.

6. The hand-held tool set forth in claim 1 wherein said motor includes winding means, a rotor, and switching means having a first position for connecting said winding means and said rotor to the power source, said switching means also having a second position for disconnecting said winding means and said rotor from the power source.

7. The hand-held tool set forth in claim 6 wherein said motor is operable to impart rotational movement on said rotor, and wherein said switching means, when in said second position, connects said rotor to said winding means in a closed loop for dissipating the rotational energy of said rotor.

8. The hand-held tool set forth in claim 7 and further comprising switch operating means for operating said switching means between said first and second positions, and wherein said inertia responsive means actuates said switch operating means to move said switching means from said first to said second position upon rapid acceleration of said hand engaging portion.

9. The hand-held tool set forth in claim 1 wherein said hand-held tool is a drill having a rotational axis, and wherein said inertia responsive means is directionally responsive and is located in spaced relation from said rotational axis.

10. The hand-held tool set forth in claim 1 wherein said hand-held tool is a drill having a rotational axis, and wherein said inertia responsive means is rotationally responsive and is located along said rotational axis.

11. The hand-held tool set forth in claim 6 wherein, in said second position, said switching means reconnects said rotor to said winding means in a continuous circuit to generate an electro-motive force that stops rotation of said rotor.

12. An electric power tool comprising:

a housing having a handle;

an output element supported by said housing;

an electric motor adapted to be connected to an electrical power source such that said motor, when energized, connects said output element to the electrical power source to impart rotational movement to said output element; and an inertia responsive element operable to disconnect said output element from the electrical power source in response to rapid movement of said handle.

13. The electric power tool set forth in claim 12 wherein said inertia responsive element disconnects said output element from the electrical power source by disconnecting said motor from the electrical power source.

14. The electric power tool set forth in claim 12 wherein said motor includes a winding connected to the electrical power source, and wherein said inertia responsive element disconnects said winding from the electrical power source in response to rapid rotational movement of said handle.

15. The electric power tool set forth in claim 12 further comprising a clutch selectively coupling said motor to said output element, wherein said inertia responsive element disconnects said output element from the electrical power source by actuating said clutch to uncouple said motor from said output element.

16. The electric power tool set forth in claim 12 wherein said motor includes a rotor, and wherein said inertia responsive element dissipates the rotational energy of said rotor in response to rapid rotational movement of said electric power tool.

17. The electric power tool set forth in claim 16 wherein said motor includes a winding connected in series with said rotor, and wherein said inertia responsive switch selectively connects said winding and said rotor in a continuous circuit to dissipate the rotational energy of said rotor and generate an electro-motive force to resist the rotation of said rotor.

18. The electric power tool set forth in claim 16 further comprising a clutch selectively coupling said rotor to said output element such that said clutch uncouples said rotor from said output element to dissipate the rotational energy of said rotor in response to rapid rotational movement of the electric power tool.

19. The electric power tool set forth in claim 12 wherein said inertia responsive element is an inertia responsive switch.

20. An electric power tool comprising:

a housing having a handle;

an output element supported by said housing and having an axis of rotation;

an electric motor adapted to be connected to an electrical power source such that said motor, when energized, connects said output element to the electrical power source to impart rotational movement on said output element, said motor including a winding and a rotor connected in series and adapted to be connected in series to the electrical power source, said rotor selectively coupled to said output element; and an inertia responsive switch disconnecting said output element from the electrical power source in response to rapid rotation of said handle, said inertia switch being a one of either directionally responsive and located in spaced relation to said axis or rotationally responsive and located along said axis, and said inertia responsive switch disconnecting said output element from the electrical power source by a one of either disconnecting said winding and said rotor from the electrical power source or disconnecting said output element from said rotor.

21. The electric power tool set forth in claim 20 wherein said inertia responsive switch disconnects said output element from the electrical power source by disconnecting said motor from the electrical power source, wherein said motor further includes a switch connected in series with said winding and said rotor, said switch having a first position connecting said winding and said rotor to the electrical power source and a second position disconnecting said winding and said rotor from the electrical power source, and wherein said inertia responsive switch actuates said switch from said first position to said second position in response to rapid rotation of said handle.

22. The electric power tool set forth in claim 20 and further comprising a clutch operable to uncouple said rotor from said output element, and wherein said inertia responsive switch disconnects said output element from the electrical power source by disconnecting said output element from said rotor, and wherein said inertia responsive switch actuates said clutch to uncouple said rotor from said output element in response to rapid rotational movement of said handle.

* * * * *